United States Patent

[11] 3,589,803

[72] Inventor Wikke Bouma
18311 Friar St., Los Angeles, Calif. 91335
[21] Appl. No. 766,223
[22] Filed Oct. 9, 1968
[45] Patented June 29, 1971

[54] CONTINUOUS FILM PROJECTOR
16 Claims, 10 Drawing Figs.

[52] U.S. Cl. .................................................. 352/72,
352/128, 352/193, 352/219
[51] Int. Cl. ............................................... G03b 9/10,
G03b 23/02
[50] Field of Search............................................ 352/72,
128, 193, 214, 219, 220

[56] References Cited
UNITED STATES PATENTS
| | | | |
|---|---|---|---|
| 1,892,412 | 12/1932 | Steiner | 352/193 UX |
| 2,279,022 | 4/1942 | Duskes | 352/128 |
| 2,513,702 | 7/1950 | Andrews | 352/220 |
| 3,176,310 | 3/1965 | Finnerty | 352/72 X |
| 3,244,470 | 4/1966 | Hennessey et al. | 352/72 X |
| 3,244,471 | 4/1966 | Mead | 352/72 |
| 3,265,457 | 8/1966 | Dale | 352/72 X |

FOREIGN PATENTS
| | | | |
|---|---|---|---|
| 698,670 | 11/1940 | Germany | 352/193 |

Primary Examiner—S. Clement Swisher
Assistant Examiner—Frederick Shoon
Attorney—Roger A. Marrs ABSTRACT: A projector is disclosed herein having a detachable cartridge for storing a continuous loop of motion picture film formed with sprocket holes and having means for removing the film from the outer loop of the film roll and guiding a portion thereof along a predetermined film-projecting path for return to the inner loop of the film roll. Light is projected through a lens system and through the film portion moving along the film-projecting path to establish an optical image projecting axis substantially normal to the film-projecting path. A shutter mechanism adapted to interrupt the optical axis and a film advancement mechanism adapted to move the film loop are driven by a common drive mechanism employing an electric motor powered by storage batteries.

PATENTED JUN29 1971
3,589,803
SHEET 1 OF 2
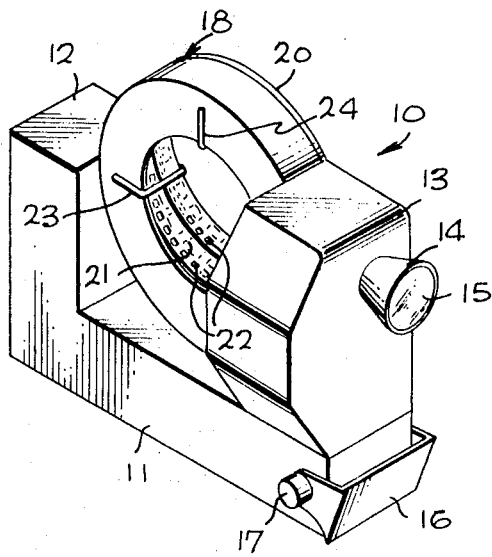
Fig.1
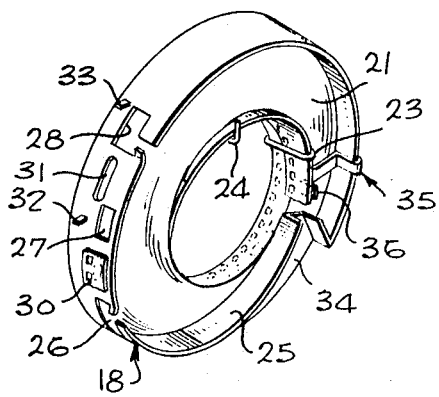
Fig.6
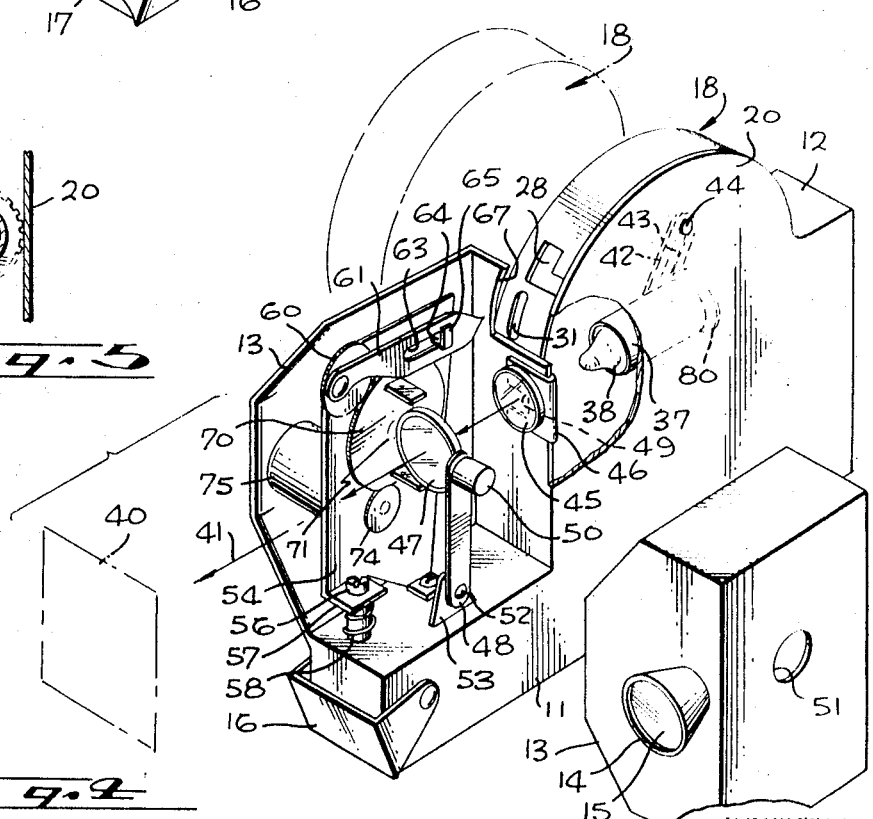
Fig.2
Fig.5
Fig.4
INVENTOR.
WIKKE BOUMA
BY Roger A. Marrs

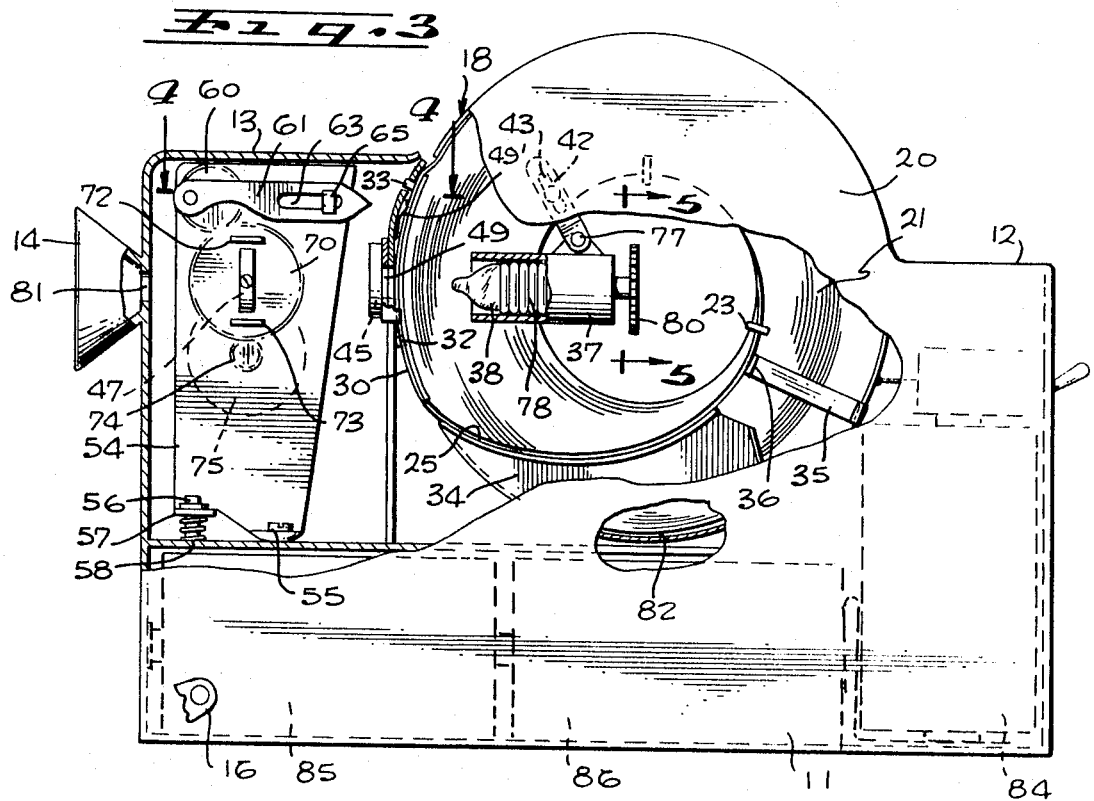

CONTINUOUS FILM PROJECTOR

BACKGROUND OF THE INVENTION

1. Field of the Invention

This invention relates to miniature motion picture projectors incorporating an endless loop of film and, more particularly, to a novel and compact projector having a film storage cartridge detachably mounted on a housing so that film friction is reduced and further incorporating a synchronous shutter and film advancement mechanism whereby the film is continuously introduced to an illumination source and lens system for projected film image display.

2. Description of the Prior Art

Although some attempts have been made in the past to design and produce a compact, low-cost motion picture projector, these prior attempts have failed to realize a truly small size, portable and trouble-free projector. In some instances, an endless loop of film is employed, such as the device disclosed in U.S. Pat. No. 2,129,467. However, extreme friction developes when a differential loop is employed as disclosed therein that not only places excessive strain on the film advancement mechanism but results in rapid film wear and image damage. Other devices, such as described in U.S. Pat. No. 2,311,204 and 2,605,674 require that the film be manually threaded on rollers and drive sprockets carried on the housing or placed on reels whereby rapid interchange or substitution of one film for another cannot be quickly or conveniently made. Even if the film is looped and threaded properly in the projector housing, the film must be tediously removed so that another film loop may be installed in the housing.

Still further problems reside in conventional devices in providing a suitable shutter mechanism, lens system and film advancement mechanism. Conventionally, the shutter and film advancement mechanisms are driven separately which increases the cost and volume of space required to mount the mechanisms. In many instances, lens systems are intentionally omitted for spaced reduction purposes which downgrade optical efficiency and image clarity.

SUMMARY OF THE INVENTION

Accordingly, the problems and difficulties encountered with the prior art are obviated by the present invention which provides a novel projector having a housing adapted to detachably mount a cartridge carrying a length of film rolled into an endless loop adapted to be moved so as to follow its natural curvature past an illumination means establishing an optical axis. A shutter mechanism and a film advancement means are movably carried on the housing ahead of the film cartridge which are synchronously driven by a common drive source or means. The shutter mechanism is adapted to interrupt the optical axis of the device while the film advancement means sequentially engages with sprocket holes in the film adjacent the optical axis from the exterior of the cartridge. A lens system is adjustably carried on the housing in the optical axis of the projector in such a manner as to permit the shutter mechanism to interrupt the optical axis at spaced intervals and to synchronize with the individual image frames carried on the film.

Therefore, it is among the primary objects of the present invention to provide a novel motion picture projector employing an endless loop of film which entirely eliminates the need for threading and rewinding of the film and which is exceedingly simple to operate and interchange additional looped film rolls.

Another object of the present invention is to provide an novel motion picture projector in which the film takes the form of an endless loop that may be carried in a cartridge for ready insertion or removal from the projector housing without any handling or threading thereof.

Still a further object of the present invention is to provide a novel motion picture projector having an endless length of film carried in a detachable cartridge wherein the looped film path follows its natural curvature past the optical axis of the projector so as to reduce film friction and film wear.

Yet another object of the present invention is to provide a novel projector having a shutter and film advancement mechanism driven by a common means wherein the optical axis of the projector is sequentially interrupted by the shutter means and the film advancement means engages with a portion of the film externally of the cartridge.

A further object of the present invention is to provide a novel portable motion picture projector having a compact arrangement comprising a detachable film storage cartridge, a shutter mechanism, a film advancement mechanism, a common drive source for the shutter and film advancement mechanism and that derives its power from storage batteries.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIG. 1 is a perspective view of the continuous film projector incorporating the present invention;

FIG. 2 is an enlarged perspective view of the projector shown in FIG. 1 illustrating a portion of the housing removed so as to expose the interior thereof;

FIG. 3 is a side elevational view of the projector shown in FIG. 2 illustrating the shutter mechanism and film advancement mechanism;

FIG. 4 is a sectional view of the shutter and film advancement mechanism as taken in the direction of arrows 4-4 of FIG. 3;

FIG. 5 is a sectional view of the mechanical ground employed in the electrical circuit for driving the mechanisms of the invention as taken in the direction of arrows 5-5 of FIG. 3;

FIG. 6 is a perspective view of the film cartridge for storage of an endless loop of film illustrated as being detached from the projector housing;

FIG. 7 is a front elevational view of the film cartridge having portions thereof broken away to illustrate film storage;

FIG. 8 is a sectional view of a portion of the film cartridge showing an inner loop of film being removed from the major length of looped film;

FIGS. 9a—d are enlarged diagrammatic views of the shutter and film advancement mechanisms illustrating a common and synchronized drive therefor; and FIG. 10 is a schematic diagram of the electrical circuit employed to operate the motor drive and to energize the illumination means by battery power.

DESCRIPTION OF THE PREFERRED EMBODIMENT

Referring to FIG. 1, the novel motion picture projector of the present invention is illustrated in the general direction of arrow 10 which includes a base 11 having a rear housing 12 and a forward housing 13. The base 11 and the rear housing 12 are adapted for holding storage batteries for providing energy to power the motor and mechanisms employed in the projector. The forward housing 13 covers the shutter and film advancement mechanisms and the mountings therefore as well as the lens system. The forward housing 13 further includes a tubular shade 14 which may or may not include a lens or glass piece 15 adapted to prevent dust, dirt or other foreign matter from entering the interior of housing 13. The shade 14 is in coaxial alignment with the optical axis of the projector.

The optical axis of the projector may be adjusted vertically by elevation means taking the form of a yoke 16 pivotally mounted on the forward end of base 11 by means of pivot connectors 17. By moving the yoke 16 to a selected position beneath base 11 and tightening the connectors 17, the forward end of the projector will be elevated or lowered, as desired. By this means, the picture may be projected along the opposite axis to a screen (not shown) remotely located from the projector and which may take the form of a flat wall surface, a sheet, a beaded screen or the like.

The forward housing 13 is disposed in fixed spaced relationship with respect to the rear housing 12 so that the space defined therebetween may be adapted to removably mount a film cartridge 18 against a partition 20 extending between the front and rear housings. The film cartridge 18 is U-shaped in cross section and is adapted to store an endless loop of film formed in a roll indicated by numeral 21, that is provided with a plurality of sprocket holes 22 along one edge thereof. The roll of film is maintained in the cartridge by inner and outer annular walls thereof which prevents radial expansion of the film loop and by means of hangers 23 and 24 is secured to the lateral wall joining the inner and outer walls.

Referring now to FIGS. 1 and 6, it can be seen that the cartridge 18 is toroidal in shape so as to confine the roll of film 21 between the outer wall and the inner wall of the cartridge. The retainer or hook members 23 and 24 project through the central opening of the film roll and are turned outwardly at their free ends so as to capture the inner convolutions of the roll 21. The outer wall of the cartridge 18 includes an inwardly directed ramp 25 adapted to slidably receive the innermost loop of the roll and which directs or guides the innermost loop laterally of the roll so that a portion of the film is laterally offset from the convoluted stack of film loops comprising the roll. The offset portion of the film is passed through a first notch or aperture 26 formed in the outer wall and directed past an aperture 27 along the exterior surface of the outer wall from interiorly of the cartridge via a slot 28 where the film portion is supplied in the form of the outer loop of the convoluted film roll. The offset portion of the film is indicated by numeral 30 shown in fragmentary representation between the slot 26 and the aperture 27.

Therefore, it can be seen that the film is moved in a projection path to the inner loop of the roll along the ramp 25 through the first slot 26 from the outer loop of the roll via slot 28. The aperture 27 is offset from the stack of film loops so that the offset film portion 30 is in alignment with the aperture 27 which may be defined as the film projection path. It is to be noted that an elongated slot 31 is provided in the outer wall of the cartridge disposed laterally of the aperture 27 and between the aperture 27 and the second slot 28. The elongated slot 31 is employed to insertably receive the film advancement mechanism which will be described later.

Furthermore, the outer wall of the cartridge 18 includes attachment portions 32 and 33 formed on the external surface thereof adjacent the aperture 27 and second slot 28, respectively, which are adapted to releasably connect the cartridge 18 with corresponding portions on the housing 13. Although the partition 20 maintains the roll of film 21 within the cartridge, the plurality of convolutions of film are captured within the cartridge by means of a wall section 34 projecting from the outer wall against the edges of the film opposite to the film edges engaged by the opposite lateral wall of the cartridge. Additionally, a retaining clip 35 is detachably coupled to the exposed edge of the outer wall of the cartridge 18 and includes a portion lying against the edges of the film in the roll. The clip further includes a foot 36 which is cantilevered on the free end of the clip so as to press against the inner loop of film as it leaves the roll to its offset position as guided by ramp 25. By means of the hangers 23 and 24 and in particular, retaining clip 35, it can be seen that the projection path of travel for the film follows the natural curvature of the loop which greatly reduces friction and provides prolonged film life.

Referring now in detail to FIG. 3, it can be seen that the film cartridge 18 may be readily mounted on the housing 13 against the partition 20 so that an illumination means is disposed behind the film portion 30 which is offset from the roll of film. The illumination means takes the from of a housing 37 for mounting a lamp 38 so as to provide a light source for projecting the film image onto a screeen or display surface 40 along an optical axis represented by arrow 41. The lamp housing 37 is mounted on the partition 20 by means of a bracket 42 having an elongated slot 43 formed therein so as to be slidably mounted on a pin 44 in threaded engagement with the partition 20. Therefore, the housing and the lamp may be moved to a desired position by slipping the bracket 42 on the pin 44 and then tightening the pin 44 so that the lamp will be set in the desired location to ensure proper lighting of the film image for projection onto the screen 40.

Disposed on the optical axis 41, there is provided a lens system comprising a first lens 45 carried on a clip 46 releasably secured in frictional engagement with a portion of the edge of housing 13. The lens 45 covers an aperture 49 formed in the rear wall in alignment with aperture 27 and the lens 45 may be slightly positioned with respect to the aperture so as to produce suitable focusing. By means of the clip 46, the lens 45 may be moved upwardly, downwardly, or to either side of the aperture under finger control of the operator. If desired, the lens 45 may be merely a culminating lens or it may be a flat piece of glass. If desired, a second lens may be provided which takes the form of a lens 47 pivotally carried on an arm 48 so that it lies on the optical axis 41 in coaxial relationship with the lens 45. If desired, only lens 47 may be employed depending on the optical characteristics of the focusing and image projection quality desired. When lens 47 is employed, it is preferably secured to one end of bracket 48 by means of a thumbscrew 50 adapted to loosen or tighten the securement connection between the bracket 48 and the lens 47. A removable portion of the front housing 13 includes a hole 51 adapted to permit the thumbscrew 50 to project exteriorly of the housing so that it may be readily grasped by the operator for adjustment purposes. By this means, the lens 47 may be pivoted about its central axis to obtain desired focusing and image quality projection. The lens 47 may be adjusted further to a desired position along the optical axis by means of a screw connection 52 which secures the other end of bracket 48 to a mount 53 carried on the base 11.

A support plate 54 is carried on the base 11 adjacent to the bracket 48 by means of screw 55 and a post and screw arrangement 56. The support plate 54 includes a flange 57 disposed between the screw and post indicated by numeral 56 which is biased in an upward direction by the expansion of coil spring 58. By this means, the support plate 54 may be slightly adjusted in a vertical direction. Such adjustment is useful in connection with the provision of a smooth film movement in the cartridge 18 via a film advancement mechanism.

The film advancement mechanism includes a gear 60 rotatably carried on the plate 54 and which has an eccentrically and pivotally mounted film feed member 61 carried thereon. The member 61 is pivotally coupled to the gear 60 via a pivot connection 62 at one of its ends and includes an elongated slot 63 adapted to receive a pin 64 so as to slidably mount the major length of the member 61 thereon. The free end of pin 64 includes a retainer 65 secured thereon which is of enlarged size so as to prevent disassembly of the member 61 from sliding support on the pin 64.

It is to be noted that the film-advancing member 61 includes a tapered end 66 formed on its end opposite to the pivotal connection with gear 60 and that the tapered end terminates in a point from converging sloping edges of approximately 35°. As the member 61 slides on pin 64 in response to rotation of gear 60, the tapered end 66 passes through an aperture 67 formed in the rear wall of housing 13 and then through the elongated slot 31 of cartridge 18 into engagement with a selected one of the sprocket holes 22 formed in the film. The action of the film advancement mechanism will be described more fully with respect to FIGS. 9a—d inclusive.

A shutter mechanism is provided which includes a gear 70 adapted to rotate on shaft 71 which is substantially coaxially disposed with respect to the pivot connection 50 for the lens 47. The gear 70 includes a pair of outwardly extending elements 72 and 73 which are secured to the side face of the gear 70 approximately 180° apart in fixed spaced-apart relationship. It is to be noted that the elements 72 and 73 extend about the lens 47 so that as the gear 70 rotates, the elements will revolve about the lens to interrupt the image projection along the optical axis 41 at spaced intervals. In this fashion, the projected image along the optical axis may be timed for interruption in synchronization with the change of image frames on the film. The gear 70 is driven by a drive gear 74 enmeshed with the teeth of gear 70 and which is driven by an electric motor 75. It is also to be understood that the gear teeth of gear 70 are in mesh with the teeth of gear 60 so that gear 60 is driven thereby. By this means, the shutter mechanism and the film advancement mechanism are synchronously driven by the common drive wheel 74 and the motor 75.

Referring now in detail to FIG. 4, it can be seen that the elements 72 and 73 are rotatably disposed about the lens 47 and that the film advancement member 61 is slidably mounted on the fixed pin 64. The tapered end of member 61 projects through a vertical slot 67 in the rear wall of housing 13 and projects further into the slot 31 of the cartridge 18 past a sprocket hole in the film portion 30. Disposed between the rear wall of the housing and the external surface of the cartridge 18, the film portion 30 is movably disposed so that the tapered end 66 of the film advancement member 61 will pass through aligned apertures 67 and 31 into engagement with sprocket hole 22.

Referring now in detail to FIG. 3, it can be seen that the lamp housing 37 is pivotally mounted on one end of bracket 42 via pivot connection 77. Therefore, not only can the lamp be adjusted vertically by means of screw connector 44, but the angle of the lamp may be adjusted via pivot 77. This is an important adjustment feature since optimum illumination requires that the end of the lamp 38 be substantially on the optical axis. Very seldom is the end of commercial lamps symmetrical so that when the lamp is placed in a socket 78, the end of the lamp will not lie on the optical axis. Therefore, the projector of the present invention permits the use of commercially available lamps which need not be made to precision specifications since adjustment of the lamp with respect to the optical axis can be readily accommodated by the pivot connections 44 and 77. It is also to be noted that the rear of the housing 37 includes a circular member or disc 80, seen more clearly in FIG. 5, wherein the periphery of the disc 80 is irregular and in contact with the inside face of partition 20. This arrangement comprises a mechanical and electrical connection so that the socket 78 and the ground terminal of the lamp 38 may be connected to the housing and base 11 as part of the electrical circuit for energizing lamp 38. Also, it can be seen that the forward wall of housing 13 includes an aperture 81 lying on the optical axis of the projector so as to permit passage of the projected image therethrough for display purposes. The film advancement gear 60 is illustrated in mesh with the shutter drive gear 70 which are driven in common by the drive wheel 74. The mounting plate 54 may be pivoted about screw 55 to permit a fine adjustment for the tapered end 66 of member 61 so as to permit the tapered end to be introduced through the aligned apertures 67, sprocket hole 22 and slot 31. Although screw 55 provides a substantially rigid connection for the plate 54, the adjustment by means of screw 56 is very slight and pivoting is reflected by a slight bending of the plate material about the screw securement.

In FIGS. 7 and 8, it can be seen that the film portion 30 moving along the outer surface or face of cartridge 18 is offset from the plurality of film convolutions in the stack or roll. Furthermore, it can be seen that the slot 31 is in alignment with the row of sprocket holes 22 and that the aperture 27 is offset from the slot 31 so as to encompass the image frames carried on the film. A feature of the invention resides in the fact that the roll of looped film does not rest on the bottom of the cartridge so that a space, indicated by numeral 82, is defined between the bottom of the film roll and the upper surface of the cartridge wall. Therefore, the roll of looped film is solely supported by the hangers 23 and 24 while the innermost loop is supported by the ramp 25 of the cartridge. In FIG. 8, the innermost loop is illustrated as being wound on from the roll 21 at the support hanger 23 which captures the removed portion 30.

In FIG. 9, the film advancement mechanism is shown. In FIG. 9a, gear 70 moves in a clockwise direction so that gear 60 rotates in a counterclockwise direction. Rotation of gear 60 causes the member 61 to slide and pivot on pin 64 as the end of member 61 moves about connection 62. Initially, the pivot connection 62 is at the bottom of gear 60 which causes the tapered end 66 to be slightly elevated. As the gear rotates to the position shown in FIG. 9d, the pivot connection is moved 90° which draws the member 61 forward so that the pin 64 is substantially at one end of slot 63. In FIG. 9c, the gear 60 has rotated an additional 90° which pivots member 61 about pin 64 so that end 66 is substantially lower as compared to its position shown in FIG. 9a and slightly away from the film portion 30 from its portion shown in FIG. 9a. Continued rotation of gear 60 causes the member 61 to assume the position as shown in FIG. 9b. In the solid line position in FIG. 9d, the end 66 is in alignment with a sprocket hole 22 and is slightly introduced thereto. An additional 45° of rotation of member 60 shows the member 61 in solid lines in FIG. 9d which causes the member 61 to pivot about pin 64 so that the end 66 is forced downwardly carrying the film portion 30 with it since the terminating end 66 is in firm engagement within the sprocket hole 22. As the end 66 of member 61 moves downwardly as shown in broken lines in FIG. 9, the film is moved in the direction of arrow 83. Once the film has been advanced, the member 61 will return to the position shown in FIG. 9a.

With reference to FIG. 10, an electric circuit for operation of the lamp 38 and the motor 75 is illustrated wherein the power supply comprises batteries 84, 85 and 86. The batteries 85 and 86 are connected in series with respect to each other and in parallel with battery 84. The lamp 38 is connected to the positive terminal of battery 84 while the motor 75 is connected between the negative terminal of battery 84 and the positive terminal of battery 85. The lamp, motor and the negative terminal of battery 86 are grounded to the housing or base to complete the electrical circuit while switches 87 and 88 may be employed to separately control the energization of the lamp and motor circuits. The batteries 84—86 are located in the base 11 as shown in FIG. 3 and one of the batteries is located in the rear housing 12; however, it is to be understood that the electrical circuit is not indicated in FIG. 3.

Therefore, it can be seen that the novel mini projector of the present invention provides a compact and portable motion picture projector. The cartridge 18 is removably disposed between the forward and rear housings and the stored loop of tape follows a natural curvature which automatically positions a portion of the film past the viewing aperture 27 so that the image carried on the film is projected along the optical axis to a viewing screen. Slippage of the film portion 30 on the cartridge is prevented by a tensioned leaf spring 49' cantilevered from the front housing 13 rearwardly so that its free end resiliently bears against the film as shown in FIG. 3. The film advancement mechanism is driven in common from a single power source with the shutter mechanism which is adapted to sequentially interrupt the optical axis at predetermined intervals. The power source employed for operating the motor is of the battery type so that the projector is cordless and does not require a line supply for power.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

What I claim is:

1. In a portable motion picture projector adapted to pass a length of film along a projection path through an illuminated optical axis of the projector comprising:

a cartridge removably mounted on said housing enclosing an endless loop of said film and having a projection aperture lying on said optical axis;

means mounted on said housing adjacent said cartridge for selectively engaging said film so as to move said film past said projection aperture;

means mounted adjacent said film-engaging means for interrupting said optical axis in synchronous relationship with film movement;

said interrupting means comprising a shutter mechanism having a pair of spaced-apart elements outwardly projecting from the same side of a disc rotatably mounted adjacent said optical axis so that said elements alternately move into and out of said optical axis in response to rotation of said disc;

means carried on said housing in operable coupling with said film-engaging means and said interrupting means for driving the film-engaging and interrupting means in common.

2. The invention as defined in claim 1 wherein
said endless loop of film constitutes a plurality of convoluted loops stacked upon themselves and wherein movement of said film follows the curvature of said loops.

3. The invention as defined in claim 2 wherein
said driving means includes an electric motor operably coupled to a storage cell power supply carried in said housing.

4. The invention as defined in claim 3 wherein
said film-engaging means includes a film advancement mechanism having an elongated film engagement member formed with a tapered end for engaging with said film.

5. In a portable motion picture projector adapted to pass a length of film along a projection path through an illuminated optical axis of the projector comprising:

a cartridge removably mounted on said housing enclosing an endless loop of said film and having a projection aperture lying on said optical axis;

said endless loop of film constitutes a plurality of convoluted loops stacked upon themselves and wherein movement of said film follows the curvature of said loops;

means mounted on said housing adjacent said cartridge for selectively engaging said film so as to move said film past said projection aperture;

said film-engaging means include a film advancement mechanism having an elongated film engagement member formed with a tapered end for engaging with said film;

means mounted adjacent said film-engaging means for interrupting said optical axis in synchronous relationship with film movement;

said interrupting means comprises a shutter mechanism having a pair of spaced-apart elements outwardly projecting from one side of a rotary disc adapted to revolve so that said elements move alternately into and out of said optical axis;

means carried on said housing in operable coupling with said film-engaging means and said interrupting means for driving the film-engaging and interrupting means in common; and said driving means includes an electric motor operably coupled to a storage cell power supply carried in said housing.

6. The invention as defined in claim 5 including
a lens system carried on said housing so as to lie on said optical axis.

7. The invention as defined in claim 6 including
means mounting said shutter mechanism elements so as to revolve about a stationary lens in said lens system.

8. The invention as defined in claim 5 including
an illumination means adjustably mounted on said housing so as to project adjacent the central opening of said endless loop on said optical axis immediately behind said projection aperture.

9. The invention as defined in claim 8 wherein
the outer loop of said endless film loops is taken laterally and directed past said projection aperture and returned as the innermost loop of said endless film loops.

10. The invention as defined in claim 9 including
hanger means for releasably securing said endless film loops to said cartridge.

11. A portable motion picture projector comprising:
a housing having a base portion and front and rear portions carried on said base portion in fixed spaced-apart relationship with respect to each other, said front portion having a pair of aligned light-passing openings;

a toroidal cartridge having a light-passing opening separating a pair of film slots and detachably mounted on said housing between said front and rear portions so as to align said cartridge opening with said pair of housing openings;

an endless film wound in a convolute roll within said cartridge and having a portion thereof external of said cartridge extending between said pair of film slots;

means movably carried in said housing front portion for advancing said film;

said housing front portion and said cartridge being formed with aligned apertures disposed between said aligned light-passing openings and a selected one of said pair of slots for allowing said advancement means to releasably engage with said film external of said cartridge;

lamp means carried on said base portion adjacent the central opening of said film roll and in alignment with said light-passing openings adapted to illuminate said film portion adjacent said light-passing openings; and electrical power means carried in said housing and operably coupled to said advancement means and said lamp means.

12. The invention as defined in claim 11 including
a shutter mechanism movably carried in said housing front portion and adapted to interrupt the path of light through said light-passing openings.

13. The invention as defined in claim 11 including
resilient means carried on said housing front portion biased against said film external of said cartridge.

14. The invention as defined in claim 11 wherein
said advancement means comprises a slotted elongated member having a tapered end adapted to pass through said aligned apertures and a pin projecting through said member slot to support said member; and
a gear pivotally connected to the end of said member opposite to its tapered end whereby said member pivots on said pin in response to rotation of said gear.

15. The invention as defined in claim 12 wherein
said advancement means and said shutter mechanism are driven in common by said power means.

16. In a portable motion picture projector adapted to pass a length of film along a projection path through an illuminated optical axis of the projector comprising:

a cartridge removably mounted on said housing enclosing an endless loop of said film and having a projection aperture lying on said optical axis;

said endless loop of film constitutes a plurality of convoluted loops stacked upon themselves and wherein movement of said film follows the curvature of said loops;

means mounted on said housing adjacent said cartridge for selectively engaging said film so as to move said film past said projection aperture;

said film-engaging means includes a film advancement mechanism having an elongated film engagement member formed with a tapered end for engaging with said film;

means mounted adjacent said film-engaging means for interrupting said optical axis in synchronous relationship with film movement;

said interrupting means comprises a shutter mechanism having a pair of spaced-apart elements adapted to revolve into and out of said optical axis;

means carried on said housing in operable coupling with said film-engaging means and said interrupting means for driving the film-engaging and interrupting means in common;

said driving means includes an electric motor operably coupled to a storage cell power supply carried in said housing;

an illumination means adjustably mounted on said housing so as to project adjacent the central opening of said endless loop on said optical axis immediately behind said projection aperture;

the outer loop of said endless film loops is taken laterally and directed past said projection aperture and returned as the innermost loop of said endless film loops; and hanger means for releasably securing said endless film loops to said cartridge.